J. F. O'CONNOR.
FRICTION SHOCK ABSORBING MECHANISM.
APPLICATION FILED APR. 26, 1920.
1,429,687.
Patented Sept. 19, 1922.
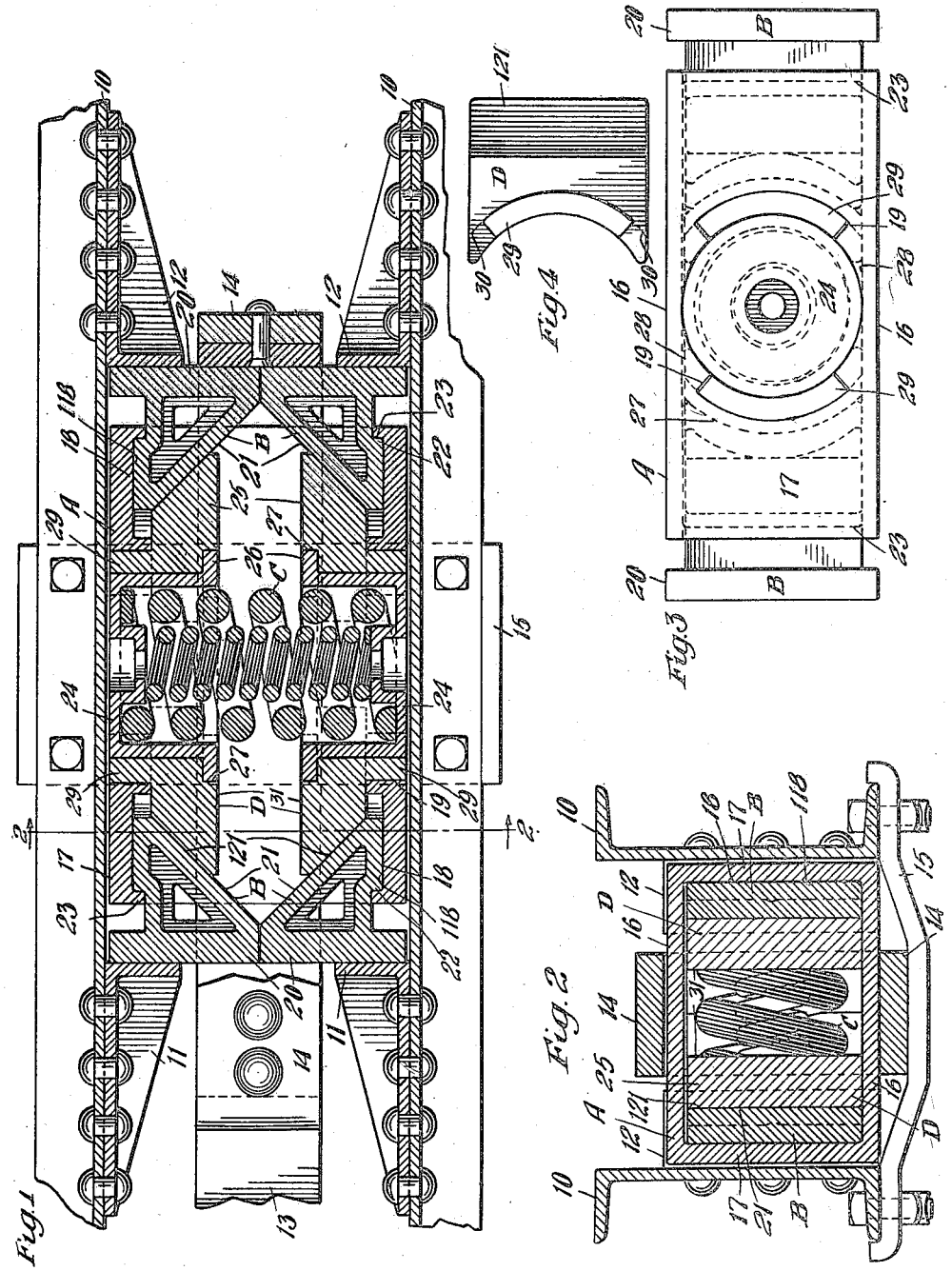
Witnesses
Wm. Geiger
Inventor
John F. O'Connor
By Geo. F. Haight
His Atty.

Patented Sept. 19, 1922.

1,429,687

UNITED STATES PATENT OFFICE.

JOHN F. O'CONNOR, OF CHICAGO, ILLINOIS, ASSIGNOR TO WILLIAM H. MINER, OF CHAZY, NEW YORK.

FRICTION SHOCK-ABSORBING MECHANISM.

Application filed April 26, 1920. Serial No. 376,495.

*To all whom it may concern:*

Be it known that I, JOHN F. O'CONNOR, a citizen of United States, residing at Chicago, in the county of Cook and State of Illinois, have invented a certain new and useful Improvement in Friction Shock-Absorbing Mechanism, of which the following is a full, clear, concise, and exact description, reference being had to the accompanying drawings, forming a part of this specification.

This invention relates to improvements in friction shock absorbing mechanism.

The object of the invention is to provide an efficient, high capacity friction shock absorbing mechanism having a large number of friction wearing surfaces and wherein the expense of renewal or repair of those parts subjected to the greatest wear, is reduced to a minimum.

More specifically the object of the invention is to provide a friction shock absorbing mechanism, wherein is employed, among other elements, laterally movable friction shoes which are formed of a multiple of parts so that, those parts subjected to the greatest wear, may be renewed without necessitating renewal of the entire friction shoe.

Other objects of the invention will more clearly appear from the description hereinafter following.

In the drawing forming a part of this specification, Figure 1 is a horizontal longitudinal sectional view of a portion of a railway draft rigging showing my improvements in connection therewith. Figure 2 is a vertical transverse sectional view taken substantially on the line 2—2 of Figure 1. Figure 3 is a side elevation of the improved shock absorbing mechanism proper; and Figure 4 is a plan view of one of the parts entering into the make-up of the laterally movable friction shoes.

In said drawing, 10—10 denote channel shaped center or draft sills of a railway car, to the inner faces of which are secured front lugs 11 and rear lugs 12. A portion of a drawbar shank is indicated at 13, the same having attached thereto a U-shaped yoke strap 14 of well known form. All of the parts may be supported by a detachable saddle plate 15.

The improved shock absorbing mechanism proper, as shown, comprises, broadly, a casting A having friction shells at each end thereof; four combined friction shoes and wedges B; a transversely extending spring C; and friction shoes designated generally by the reference D.

The casting A is of substantially hollow rectangular box-like form and has upper and lower walls 16—16 and side walls 17—17. At each end, the casting A is formed as a friction shell with opposed longitudinally extending friction surfaces 18—18. Each side wall of the casting A is cut away or recessed as indicated at 19 to accommodate portions of the laterally movable friction shoes, as hereinafter described.

Each of the combined wedge-shoes B is formed with a half follower 20, a longitudinally extending friction surface 118 on its outer side and an inclined friction wedge surface 21. Each member B is also formed with an outwardly facing shoulder 22 adapted to cooperate with a corresponding flange or shoulder 23 on the casting A to limit the outward movement of the wedge-shoes B with respect to the friction shells, as will be understood. The inward movement of the wedge-shoes B with respect to the friction shells is limited by engagement with the follower 20 at the ends of the casting A, as will be evident from an inspection of Figure 1.

The laterally movable friction shoes D are two in number and of like construction. Each of said shoes D comprises three elements, namely, a single spring cap or follower 24 and two like end friction shoes proper 25—25. The spring caps or followers 24 are of hollow cylindrical cup-like form and at their inner edges are provided with laterally extended flanges 26, the flanges 26 having arcuate outer edges 27 and end edges 28—28 extending parallel to the side walls 17, as shown in Figure 3. Each of the friction shoes proper 25, as shown in Figure 4, is formed with an outer inclined friction wedge surface 121, to cooperate with a corresponding surface 21, and with an outwardly extended arcuate flange 29 arranged to snugly fit the cap 24 and extend into the recess 19. At their inner ends, the members 25 are provided with arcuate rabbets 30 to accommodate the flanges 26 so as to bring the inner face of the cap 24 flush with the inner longitudinally extending faces 31 of the member 25. The parts are also preferably designed so that the shoes D will come into contact with each other simultaneously with the engagement of the follower sections 20 with the ends of the casting A.

With the construction shown, it is evident that those parts B and 25 which are subjected to the greatest wear, are in relatively small pieces preferably in the form of castings and may be individually renewed or replaced at a minimum expense. It will also be noted that I obtain no less than eight sets of cooperating friction surfaces, four of which sets extend parallel to the center line of the gear and the other four extending at an angle thereto, thus obtaining high frictional capacity without militating against the effective release of the parts at the end of the compressive stroke.

I claim:

1. In a friction shock absorbing mechanism, the combination with a friction shell having interior friction surfaces and provided with opposed arcuate openings; of combined friction shoes and wedges cooperable with said friction surfaces of the shell and movable lengthwise thereof; a pair of laterally movable friction shoes within the shell, each of said laterally movable shoes including a substantially cylindrical spring cap and separate end shoes proper, each of the latter having an arcuate flange fitting the spring cap and the spring cap and said flanges extending within said openings of the shell, the shoes proper having inclined surfaces cooperable with said wedge-shoes; and spring means interposed between said laterally movable shoes.

2. In a friction shock absorbing mechanism, the combination with a casting having a friction shell at each end thereof, said shell having interior friction surfaces extending lengthwise thereof and said casting being provided with opposed arcuate openings in its side walls; of a pair of independent combined friction shoes and wedges cooperable with each friction shell, each of said wedge-shoes having an outer longitudinally extending friction surface and an inclined friction surface at its inner end; laterally movable friction shoes within the casting, each laterally movable shoe, including a substantially cylindrical spring cap and separate end shoes proper, each of the latter having an arcuate flange conforming to the spring cap, said flanges and caps extending within said openings of the casting; and spring means interposed between said laterally movable friction shoes.

3. In a friction shock absorbing mechanism, the combination with a casting having a friction shell at each end thereof, the opposed side walls of said shell having central openings therein; of a pair of independent combined friction shoes and wedges cooperable with each shell; laterally movable friction shoes within the casting, each of said laterally movable shoes comprising a pair of independent end shoes proper and a spring cap, said shoes proper and the cap having portions thereof extending outwardly within said recesses, the cap and shoes proper having shouldered engagement with each other; and spring means interposed between said laterally movable friction shoes.

4. In a friction shock absorbing mechanism, the combination with a casting having a friction shell at each end thereof, the opposed side walls of said shell having central openings therein; of a pair of independent combined friction shoes and wedges cooperable with each shell; laterally movable friction shoes within the casting, each of said laterally movable shoes comprising a pair of independent end shoes proper and a spring cap, said shoes proper and the cap having portions thereof extending outwardly within said recesses, the cap and shoes proper having shouldered engagement with each other; spring means interposed between said laterally movable friction shoes; and cooperating shoulders on said wedge-shoes and shells limiting the outward movement of the wedge-shoes with respect to the shells.

In witness that I claim the foregoing I have hereunto subscribed my name this 12th day of Apr., 1920.

JOHN F. O'CONNOR.

Witness:
CARRIE GAILING.